(12) United States Patent
Juriga

(10) Patent No.: US 8,960,698 B2
(45) Date of Patent: Feb. 24, 2015

(54) SUSPENSION ARRANGEMENT FOR A VEHICLE

(71) Applicant: Rassini Frenos, S.A. de C.V., Lomas de Chapultepec (MX)

(72) Inventor: James A. Juriga, Beverly Hills, MI (US)

(73) Assignee: Rassini, S.A. de C.V. (MX)

( * ) Notice: Subject to any disclaimer, the term of this patent is extended or adjusted under 35 U.S.C. 154(b) by 0 days.

(21) Appl. No.: 13/924,132

(22) Filed: Jun. 21, 2013

(65) Prior Publication Data

US 2014/0008887 A1 Jan. 9, 2014

Related U.S. Application Data

(63) Continuation of application No. 12/990,612, filed as application No. PCT/US2009/002782 on May 4, 2009, now Pat. No. 8,490,992.

(60) Provisional application No. 61/126,426, filed on May 2, 2008.

(51) Int. Cl.
*B60G 11/46* (2006.01)
*B60G 11/36* (2006.01)
*B60G 9/02* (2006.01)
*B60G 11/34* (2006.01)
*B60G 11/04* (2006.01)

(52) U.S. Cl.
CPC *B60G 11/36* (2013.01); *B60G 9/02* (2013.01); *B60G 11/34* (2013.01); *B60G 11/04* (2013.01); *B60G 11/46* (2013.01); *B60G 2202/117* (2013.01); *B60G 2202/12* (2013.01); *B60G 2202/152* (2013.01); *B60G 2204/121* (2013.01); *B60G 2204/4502* (2013.01); *B60G 2206/601* (2013.01)
USPC .................................................. 280/124.163

(58) Field of Classification Search
USPC .............. 280/124.163, 124.17, 124.174, 680, 280/686; 267/36.1, 38, 44, 45, 52
See application file for complete search history.

(56) References Cited

U.S. PATENT DOCUMENTS 2,251,274 A 12/1881 Norton
1,086,182 A 2/1914 Jackson
(Continued)

FOREIGN PATENT DOCUMENTS

GB 855805 12/1960
JP H05-096926 4/1993
(Continued)

OTHER PUBLICATIONS

English Translation of Notification of Reasons for Rejection dated Oct. 30, 2012 regarding JP App. No. 2011-507492; 3 pgs.
(Continued)

*Primary Examiner* — Paul N Dickson
*Assistant Examiner* — Robert A Coker
(74) *Attorney, Agent, or Firm* — Cantor Colburn LLP

(57) ABSTRACT

A suspension arrangement for a vehicle including a leaf spring element having a substantially longitudinal configuration. Also included is a deflection limiting element coupled to said leaf spring element at an intermediate location thereof, wherein said deflection limiting element comprises a J-shaped spring element. Further included is a resilient element attached to said J-shaped spring element.

7 Claims, 5 Drawing Sheets

(56) References Cited

U.S. PATENT DOCUMENTS

| | | | | |
|---|---|---|---|---|
| 1,149,617 | A | * | 8/1915 | Bick ................... 280/124.113 |
| 1,380,722 | A | * | 6/1921 | Kost et al. ...................... 267/45 |
| 1,604,665 | A | * | 10/1926 | Siprelle et al. ................. 267/45 |
| 1,858,930 | A | * | 5/1932 | Hoover ............................ 267/46 |
| 2,632,639 | A | | 3/1953 | Proske |
| 2,791,419 | A | | 4/1954 | Whelen |
| 2,826,407 | A | | 3/1958 | Scheublein et al. |
| 2,874,956 | A | * | 2/1959 | La Belle ....................... 267/241 |
| 2,969,230 | A | | 1/1961 | Scheublein et al. |
| 3,038,715 | A | | 6/1962 | Davidson et al. |
| 3,133,956 | A | * | 5/1964 | Robinson ...................... 558/361 |
| 3,305,230 | A | | 2/1967 | Musser |
| 3,312,459 | A | | 4/1967 | Pence |
| 3,462,169 | A | | 8/1969 | Carter |
| 3,617,072 | A | * | 11/1971 | Turner, Jr. ................... 280/86.5 |
| 3,730,548 | A | | 5/1973 | Thaxton |
| 3,850,444 | A | | 11/1974 | Wright et al. |
| 3,877,718 | A | * | 4/1975 | Scanlon et al. ............. 280/86.5 |
| 4,000,913 | A | * | 1/1977 | Gibson ........................ 280/86.5 |
| 4,282,945 | A | | 8/1981 | Bessey |
| 4,313,620 | A | * | 2/1982 | Posnikoff .............. 280/124.106 |
| 4,966,387 | A | * | 10/1990 | White, IV .............. 280/124.163 |
| 4,982,972 | A | | 1/1991 | Preston et al. |
| 5,024,463 | A | | 6/1991 | Oliver et al. |
| 5,029,893 | A | | 7/1991 | Walton et al. |
| 5,046,752 | A | | 9/1991 | Stephens et al. |
| 5,137,300 | A | | 8/1992 | Walton |
| 5,265,907 | A | * | 11/1993 | Tostado ........................ 280/788 |
| 5,560,641 | A | * | 10/1996 | Vogler ................. 280/124.163 |
| 2005/0269796 | A1 | | 12/2005 | Sawarynski et al. |

FOREIGN PATENT DOCUMENTS

| | | |
|---|---|---|
| JP | 2005096494 A | 4/2005 |
| WO | 2006121438 A2 | 11/2006 |
| WO | 2007057698 A2 | 5/2007 |
| WO | 2007149442 A2 | 12/2007 |

OTHER PUBLICATIONS

European Search Report; European Application No. 09746918.3; European Filing Date: Mar. 22, 2012; Date of Mailing: Apr. 4, 2012; 13 pages.

International Search Report for PCT/US2009/002782 dated Dec. 8, 2009.

Extended Search Report for related App. No. 13173293.5-1752; dated Sep. 30, 2013; 11 pages.

* cited by examiner

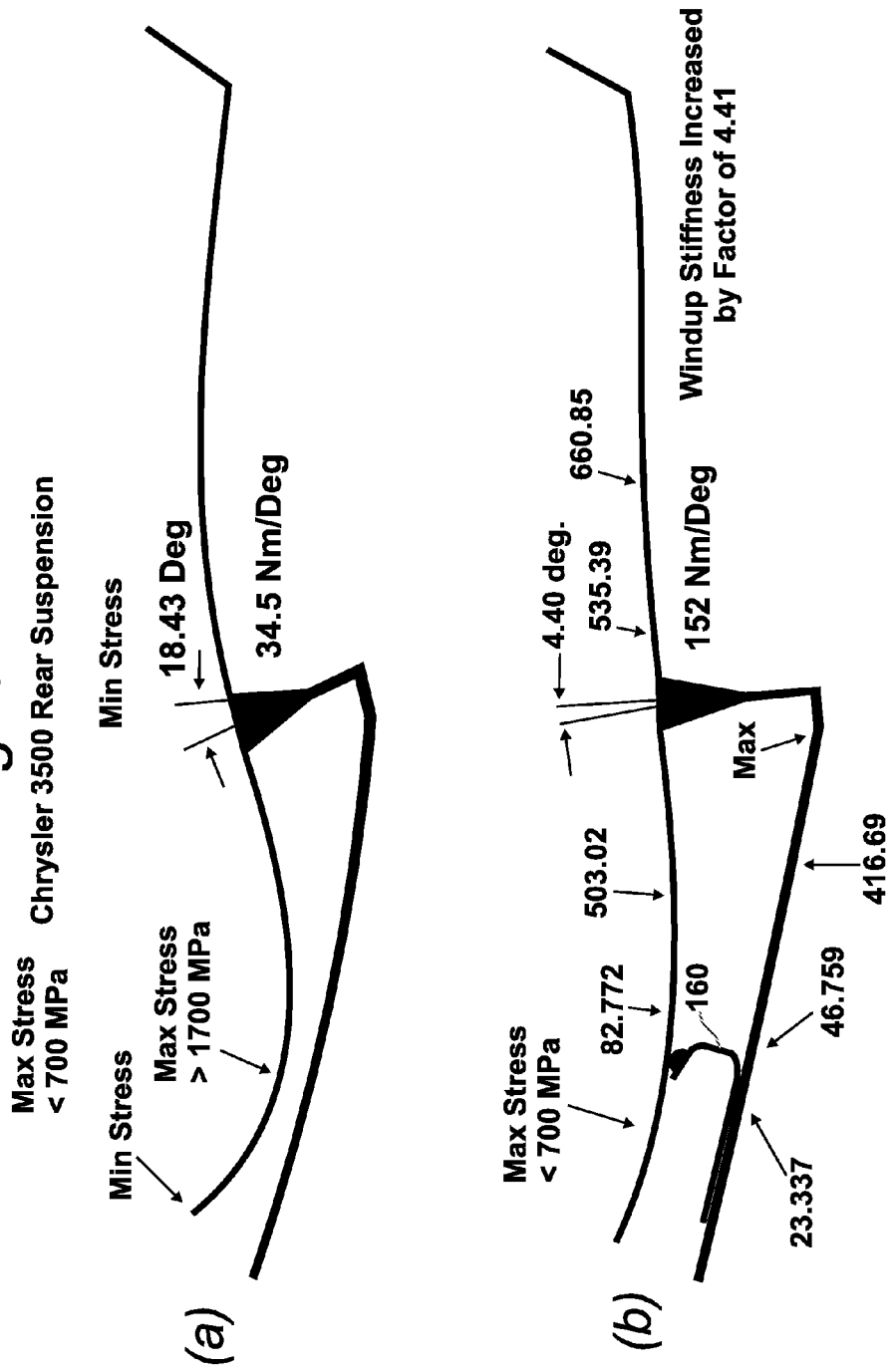

SUSPENSION ARRANGEMENT FOR A VEHICLE

CROSS-REFERENCE TO RELATED APPLICATIONS

This patent application claims priority to U.S. patent application Ser. No. 12/990,612, filed Mar. 2, 2011, which claims the benefit of International Application Serial No. PCT/US2009/002782, filed May 4, 2009, which claims the benefit of U.S. Provisional Patent Application Ser. No. 61/126,426, filed May 2, 2008, each of which are incorporated herein by reference in their entireties.

FIELD OF THE INVENTION

This invention relates generally to suspension systems for vehicles, and more particularly, to a leaf suspension arrangement that employs a dual leaf suspension with a deflection limiting element disposed therebetween

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one other to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

The well-known Hotchkiss drive, the name of which derives from the French automobile firm of Hotchkiss, employs a solid axle that is coupled at its ends to the centers of respective semi-elliptical leaf springs. There are a number of problems with this form of drive arrangement. First, this drive system is characterized by high unsprung mass. Additionally, the use of a solid axle results in coupled left/right wheel motion. During heavy cornering and fast acceleration, this known system suffers from vertical deflection and wind-up.

One effort to address the problems associated with the Hotchkiss system employs a parallel leaf spring arrangement at each end of a solid axle. This known arrangement affords increased axle control, in the form of reduced power hop. Other advantages of this arrangement include roll under steer, auto load leveling and the gross vehicle weight, and no frame changes are required to convert from a Hotchkiss system. However, the parallel leaf spring arrangement employs a solid axle, and therefore does not provide the benefits of independent suspension. In addition, this arrangement is plagued with the disadvantage of high unsprung mass.

A de Dion tube vehicle suspension arrangement is a known form of semi-independent suspension and constitutes an improvement over the Hotchkiss drive. In this type of suspension, universal joints are employed at the wheel hubs and the differential, and additionally provided is a solid tubular beam that maintains the opposing wheels in parallel. The de Dion tube is not directly connected to the chassis and is not intended to flex.

The benefits of a de Dion suspension include a reduction in the unsprung weight compared to the Hotchkiss drive. This is achieved by coupling the differential to the chassis. In addition, there are no camber changes during suspension unloading. Since the camber of both wheels is set at zero degrees, the traction from wide tires is improved, and wheel hop under high power operations is reduced compared to an independent suspension. However, the de Dion tube adds unsprung weight.

SUMMARY OF THE INVENTION

According to one embodiment, a suspension arrangement for a vehicle includes a leaf spring element having a substantially longitudinal configuration. Also included is a deflection limiting element coupled to said leaf spring element at an intermediate location thereof, wherein said deflection limiting element comprises a J-shaped spring element. Further included is a resilient element attached to said J-shaped spring element.

According to another embodiment, a vehicle suspension arrangement for a vehicle of the type having a chassis rail and a longitudinal axle arranged substantially orthogonal to the chassis rail, the vehicle suspension arrangement including a primary leaf spring having a plan view longitudinal configuration, a first end for pivotally coupling to the chassis of the vehicle at a first pivot coupling, and a second end for coupling to the chassis of the vehicle at a second pivot coupling. Also included is a secondary leaf spring having a plan view longitudinal configuration, a first end for pivotally coupling to the chassis of the vehicle at a pivot coupling, and a second end for coupling to the longitudinal axle. Further included is a deflection limiting element disposed between the primary and secondary leaf springs for controlling a distance therebetween, the deflection limiting element disposed at an intermediate location relative to the first end and the second end of the secondary leaf spring.

According to yet another embodiment, a method of controlling a ride characteristic of a vehicle having a dual leaf suspension with first and second leaf elements is provided. The method includes limiting the distance between the first and second leaf elements with a J-shaped deflection limiting element disposed between the first and second leaf elements.

BRIEF DESCRIPTION OF THE DRAWINGS

Comprehension of the invention is facilitated by reading the following detailed description, in conjunction with the annexed drawing, in which:

FIGS. 6(a) and 6(b) are simplified schematic representations that illustrate the stresses that result from leaf spring wind-up.

DETAILED DESCRIPTION

Figure 1:
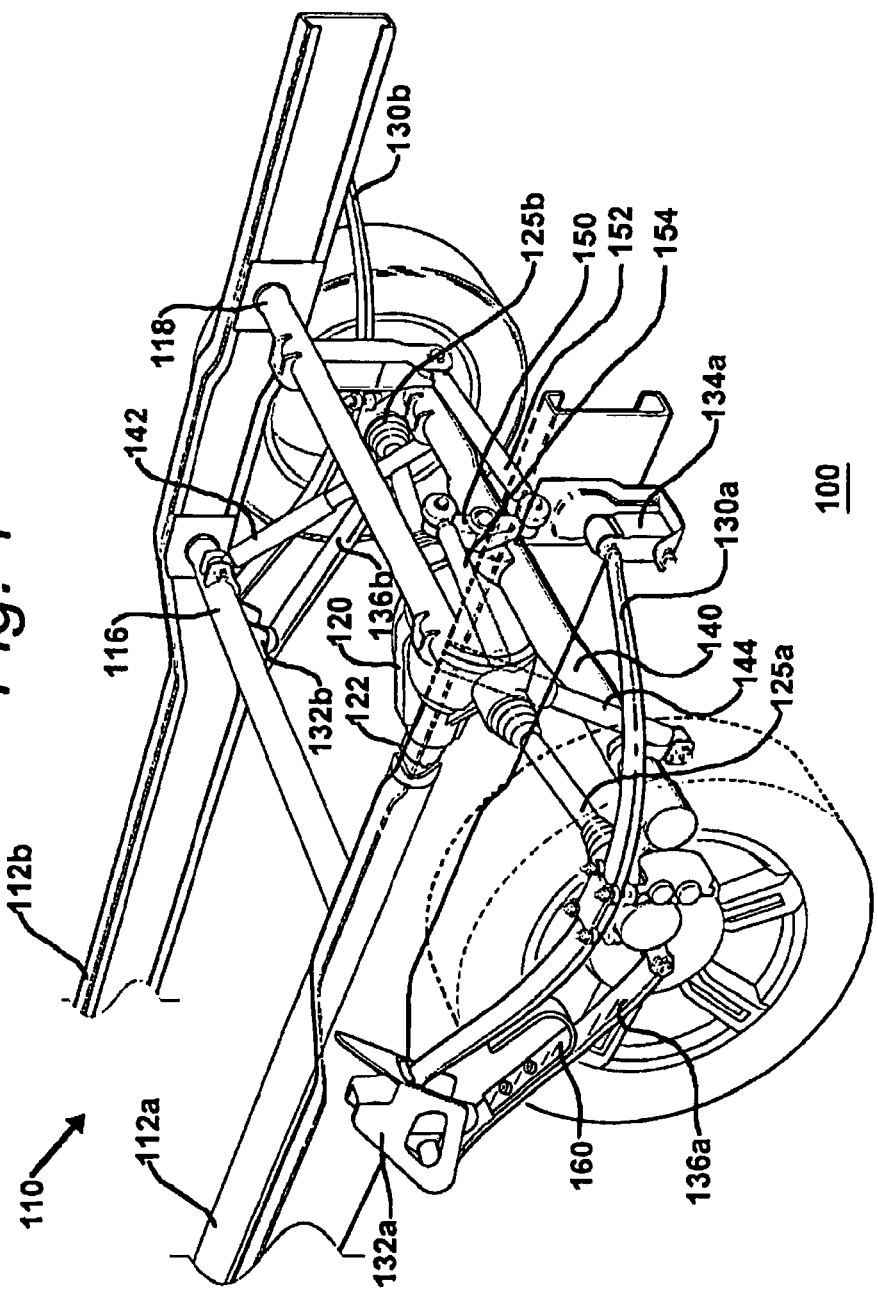
FIG. 1 is a perspective view of a suspension arrangement according to one embodiment of the invention.

FIG. 1 is a perspective representation of a specific illustrative embodiment of the invention. As shown in this figure, a vehicle suspension system 100 has a chassis that is generally designated as chassis 110. The chassis has a pair of substantially parallel chassis rails 112a and 112b that are coupled to one another by cross-braces 116 and 118.

A differential drive arrangement 120 is fixedly coupled to the chassis and converts the rotary motion of a drive shaft 122 to substantially orthogonal rotary motion at half shafts 125a and 125b. Each half shaft has an associated pair of universal joints (not specifically designated) that are arranged to be proximal and distal with respect to the differential drive arrangement. Thus, the half shafts, each of which has an associated longitudinal axis (not shown), accommodate transaxial motion, particularly by operation of the proximal universal joints.

Half shafts 125a and 125b are shown to be coupled at their distal ends to respective leaf springs 130a and 130b. Referring to leaf spring 130a, for example, the leaf spring is, in this specific illustrative embodiment of the invention, pivotally coupled at its forward end to a bracket 132a. At its rearward end, leaf spring 130a is pivotally coupled to a link 134a. As shown in this figure, there is additionally provided a half leaf spring 136a that is also, in this specific illustrative embodiment of the invention, coupled at its forward end to bracket 132a. At its rearward end, half leaf spring 136a is coupled to the distal end of half shaft 125a. Half leaf spring 136a is shown in this specific illustrative embodiment of the invention, to engage a fulcrum 133a.

In this embodiment of the invention, there is attached to half leaf spring 136a a J-shaped spring element 160. J-shaped spring element 160 is, in this specific illustrative embodiment of the invention, coupled to half leaf spring 136a by two fasteners (not specifically designated in this figure). J-shaped spring element 160, additional elements of structure related thereto, such as an elastomeric fulcrum element (not shown in this figure) disposed between the J-shaped spring element and leaf spring 130a, and its kinematic and other effects on the characteristics of half leaf spring 136a and leaf spring 130a, will be described in greater detail below. A further J-shaped spring element is, in the practice of the invention, installed on half leaf spring 136b. However, the further J-shaped spring element on half leaf spring 136b is not shown in this figure for sake of clarity of the figure.

There is additionally shown in this figure a transverse beam 140 that is coupled to cross-brace 116 by a damper 142 and to cross-brace 118 by a further damper 144. Transverse beam 140 has installed thereon a pivoting member 150 to which are attached link elements 152 and 154. The link elements are attached, via brackets (not specifically designated), to cross-brace 118.

It is to be understood that the inventive J-shaped spring element 160 described herein is not limited in its application to the specific suspension arrangement represented in FIG. 1. Persons of skill in the art, in light of the teaching herein, will be able to generate additional embodiments of the J-shaped spring element as required to be accommodated within other vehicle suspension arrangements. Such additional embodiments may include, for example, a J-shaped spring element that more closely resemble an L-shaped spring element, as shown in the schematic representation of FIG. 6(b); a C-shaped spring element (not shown); a pillar, or I-shaped spring element (not shown); a closed, or O-shaped spring element (not shown); a U-shaped spring element (not shown); or the like. However, for purposes of the description of the invention herein presented, the term "J-shaped spring element" shall be deemed to encompass all such alternative embodiments and equivalents thereof.

Figure 2:
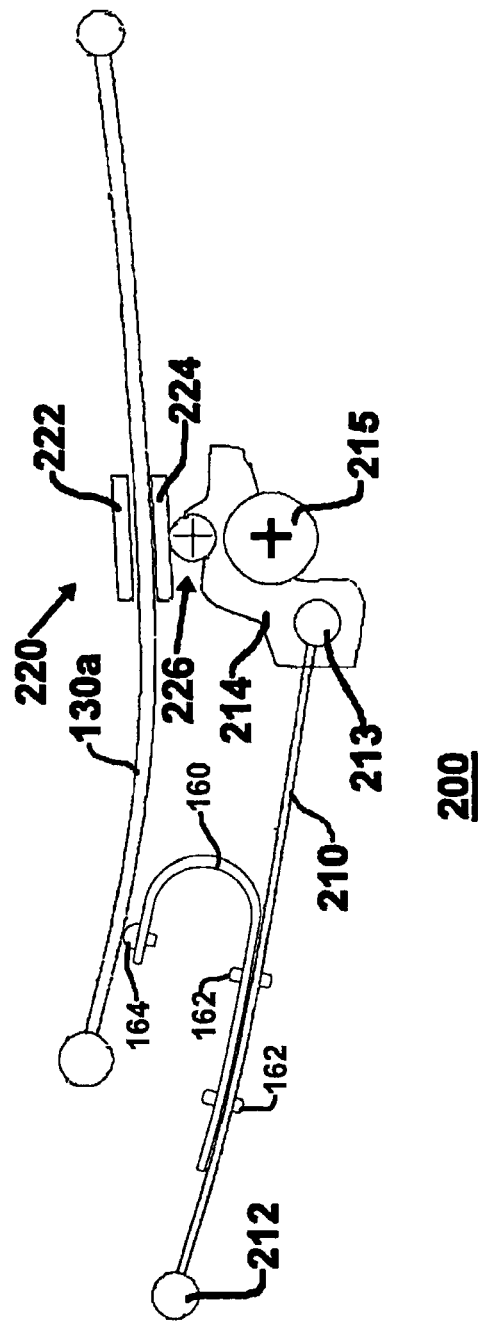
FIG. 2 is a side plan simplified schematic illustration of a rotary joint suspension arrangement and a deflection limiting element in accordance with an aspect of the invention.

FIG. 2 is a side plan simplified schematic illustrations of a rotaryjoint suspension arrangement 200 and further having J-shaped spring element 160 constructed in accordance with the principles of the invention. Elements of structure that bear analogous correspondence to elements of structure that have previously been discussed are similarly designated in this figure. Referring to FIG. 2, it is seen that there is provided a leaf spring 130a that, in this specific illustrative embodiment of the invention, is pivotally coupled at its forward and rear ends, as previously described. There is additionally provided a half leaf spring 210 that is also, in this specific illustrative embodiment of the invention, pivotally coupled at a pivot mount 212 at its end distal to a further pivotal mounting 213 at a coupling member 214. The coupling member is itself coupled to axle shaft 215.

FIG. 2 further illustrates a pivot link mounting arrangement 220 wherein leaf spring 130a is securely clamped between clamping member 222 and 224. Clamping member 224 is coupled to a pivot joint 226 that is itself engaged with coupling 214. This arrangement permits a further degree of motion that reduce system internal loading on the pivot joint arrangement and leaf spring elements.

In accordance with the invention, there is provided J-shaped spring element 160 coupled to half leaf spring 210 by means of fasteners 162. J-shaped spring element has a fulcrum element 164 formed, in this specific illustrative embodiment of the invention, of an elastomeric material. Fulcrum element 164, as will be described below, communicates with leaf spring 130a to effect an advantageous change in the overall spring characteristic of the vehicle suspension.

Figure 3:
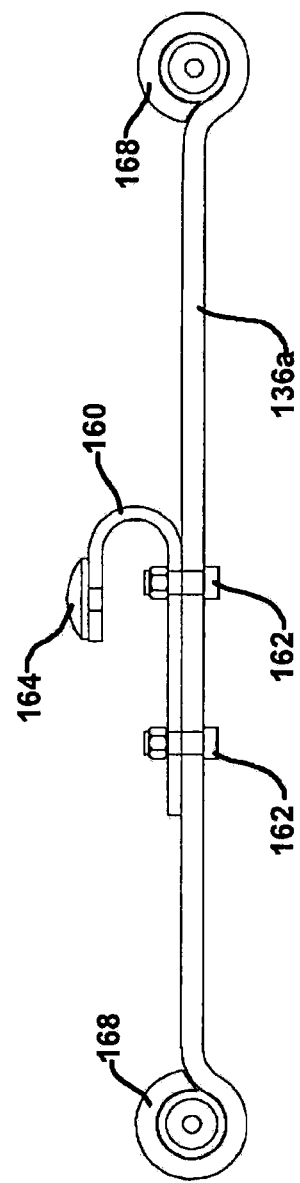
FIG. 3 is a simplified lateral plan representation of a half leaf spring with the deflection limiting element attached thereto.

FIG. 3 is a simplified lateral plan representation of the half leaf spring with the J-shaped spring element attached thereto. Elements of structure that have previously been discussed are similarly designated. As shown in this figure, J-shaped spring element 160 coupled to half leaf spring 210 by means of fasteners 162. The J-shaped spring element has installed thereon a fulcrum element 164 formed, for example, of an elastomeric material. J-shaped spring element 160 has at each of its ends, terminations 168 that facilitate pivotal coupling of the J-shaped spring element to the chassis (not shown in this figure) and the axle (not shown in this figure) in a conventional manner.

Figure 4:
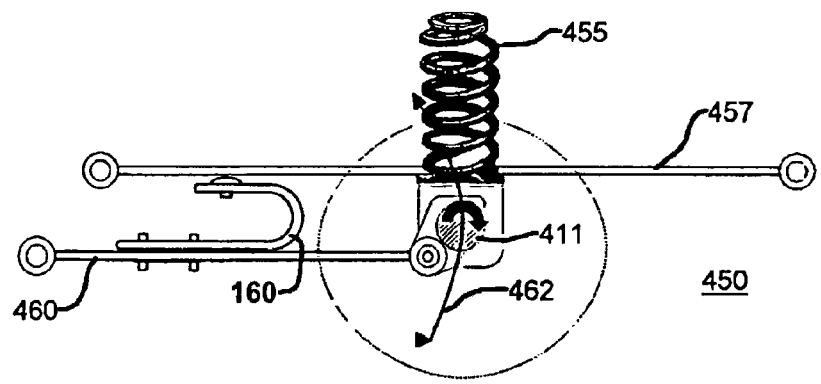
FIG. 4 is a simplified schematic representation of a side view of the suspension arrangement constructed in accordance with another aspect of the invention.

FIG. 4 is a simplified schematic representation of a side view of a suspension system constructed in accordance with the principles of the invention with a 1st stage consisting of a coil spring. Elements of structure that have previously been discussed are similarly designated. Coil spring 455 provides vertical load support in combination with first stage leaf spring 457. A lower leaf 460 of the 2nd stage is employed for additional control. In this specific illustrative embodiment of the invention, the center of axle 411 travels along a path that conforms to curved arrow 462, as seen in the present side view. In accordance with the invention, J-shaped spring element 160 is shown to be coupled to lower leaf 460 by means of fasteners (not specifically designated in this figure). As previously noted, in other embodiments of the invention the J-shaped spring element is coupled to first stage leaf spring 457, such other embodiments not being shown.

Figure 5:
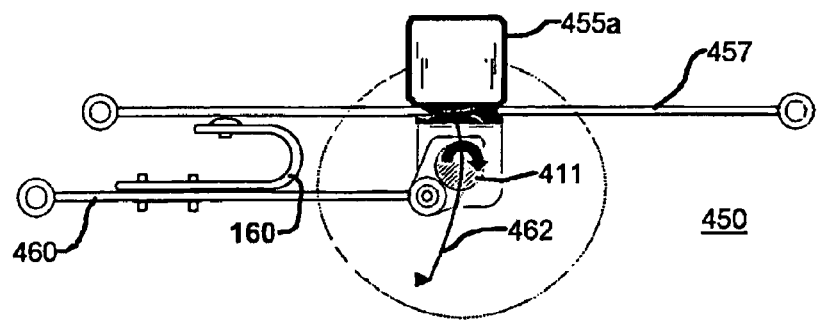
FIG. 5 is a simplified schematic representation of a side view of the suspension arrangement in accordance with another aspect of the invention.

FIG. 5 is a simplified schematic representation of a side view of a suspension system constructed in accordance with the principles of the invention with a 1st stage consisting of an air-pressure responsive resilient element in the form of an air spring 455a. Elements of structure that have previously been discussed are similarly designated. Air spring 455a provides vertical load support in combination with first stage leaf spring 457. As described above in relation to FIG. 4, lower leaf 460 of the 2nd stage is employed for additional control. Center of axle 411 travels along a path that conforms to curved arrow 462, as seen in the present side view. In accordance with the invention, J-shaped spring element 160 is shown to be coupled to lower leaf 460 by means of fasteners (not specifically designated in this figure).

FIGS. 6(*a*) and 6(*b*) are simplified schematic representations that illustrate the stresses that result from leaf spring wind-up (FIG. 6(*a*)) without the J-shaped spring element, and the beneficial effect that is achieved when the J-shaped spring element is employed (FIG. 6(*b*)). The schematic representations of these figures represent computer models of the stresses applied in an embodiment of the invention installed on a Chrysler heavy duty truck (3500 series). As shown in FIG. 6(*a*), there is not provided a J-shaped spring element, and the resulting wind-up of the primary leaf spring results in a stress applied that exceeds 1700 MPa. The rotational displacement resulting from this wind-up stress is on the order of 18.43[deg.], which translates into a stiffness parameter of approximately 34.5 Nm/degree.

FIG. 6(*b*) illustrates computer-modeled stresses that are applied to the leaf spring elements when the J-shaped spring element is employed (shaped substantially as an L-shaped spring element). As shown, the primary spring experiences a range of stresses from less than 700 MPa to approximately 660.85 MPa. Thus, the stress is reduced considerable by implementation of the J-shaped spring element. In addition, it is noted that the rotational displacement resulting from this wind-up stress is on the order of 4.40 [deg.], which translates into a stiffness parameter of approximately 152 Nm/degree. This equates to an increase in stiffness by a factor of 4.41, without significant increase in unsprung mass.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A vehicle suspension arrangement for a vehicle having a chassis rail and a longitudinal axle arranged substantially ortho oval to the chassis rail the vehicle suspension arrangement comprising:
   a primary leaf spring having a plan view longitudinal configuration, a first end for pivotally coupling to the chassis of the vehicle at a first pivot coupling, and a second end for coupling to the chassis of the vehicle at a second pivot coupling;
   a secondary leaf spring having a plan view longitudinal configuration, a first end for pivotally coupling to the chassis of the vehicle at a pivot coupling, and a second end for coupling to the longitudinal axle;
   a deflection limiting element disposed between the primary and secondary leaf springs for controlling a distance therebetween, the deflection limiting element disposed at an intermediate location relative to the first end and the second end of the secondary leaf spring; and
   a coupler portion arranged intermediate of the first and second ends.

2. The vehicle suspension arrangement of claim 1, wherein the deflection limiting element comprises a J-shaped spring element.

3. The vehicle suspension arrangement of claim 1, wherein the deflection limiting element is coupled to a selectable one of said primary and secondary leaf springs.

4. A vehicle suspension arrangement for a vehicle of the type having a chassis rail and a longitudinal axle arranged substantially orthogonal to the chassis rail the vehicle suspension arrangement comprising:
   a primary leaf spring having a plan view longitudinal configuration, a first end for pivotally coupling to the chassis of the vehicle at a first pivot coupling, and a second end for coupling to the chassis of the vehicle at a second pivot coupling;
   a secondary leaf spring having a plan view longitudinal configuration, a first end for pivotally coupling to the chassis of the vehicle at a pivot coupling, and a second end for coupling to the longitudinal axle; and
   a deflection limiting element disposed between the primary and secondary leaf springs for controlling a distance therebetween, the deflection limiting element disposed at an intermediate location relative to the first end and the second end of the secondary leaf spring;
   wherein the deflection limiting element comprises a J-shaped spring element;
   wherein the J-shaped spring element is coupled to a selectable one of said primary and secondary leaf springs.

5. A vehicle suspension arrangement for a vehicle having a chassis rail and a longitudinal axle arranged substantially orthogonal to the chassis rail, the vehicle suspension arrangement comprising:
   a primary leaf spring having a plan view longitudinal configuration, a first end for pivotally coupling to the chassis of the vehicle at a first pivot coupling, and a second end for coupling to the chassis of the vehicle at a second pivot coupling;
   a secondary leaf spring having a plan view longitudinal configuration, a first end for pivotally coupling to the chassis of the vehicle at a pivot coupling, and a second end for coupling to the longitudinal axle;
   a deflection limiting element disposed between the primary and secondary leaf springs for controlling a distance therebetween, the deflection limiting element disposed at an intermediate location relative to the first end and the second end of the secondary leaf spring; and
   a principal resilient element having a determinable resilience characteristic, the principal resilient element having a first portion for coupling to the chassis of the vehicle and a second portion for coupling to the longitudinal axle.

6. The vehicle suspension arrangement of claim 5, wherein the principal resilient element is a coil spring.

7. The vehicle suspension arrangement of claim 5, wherein the principal resilient element is an air-pressure-responsive resilient element.

* * * * *